Aug. 23, 1927.
J. F. O'CONNOR
1,640,206
FRICTION SHOCK ABSORBING MECHANISM
Filed Dec. 27, 1921      2 Sheets-Sheet 1
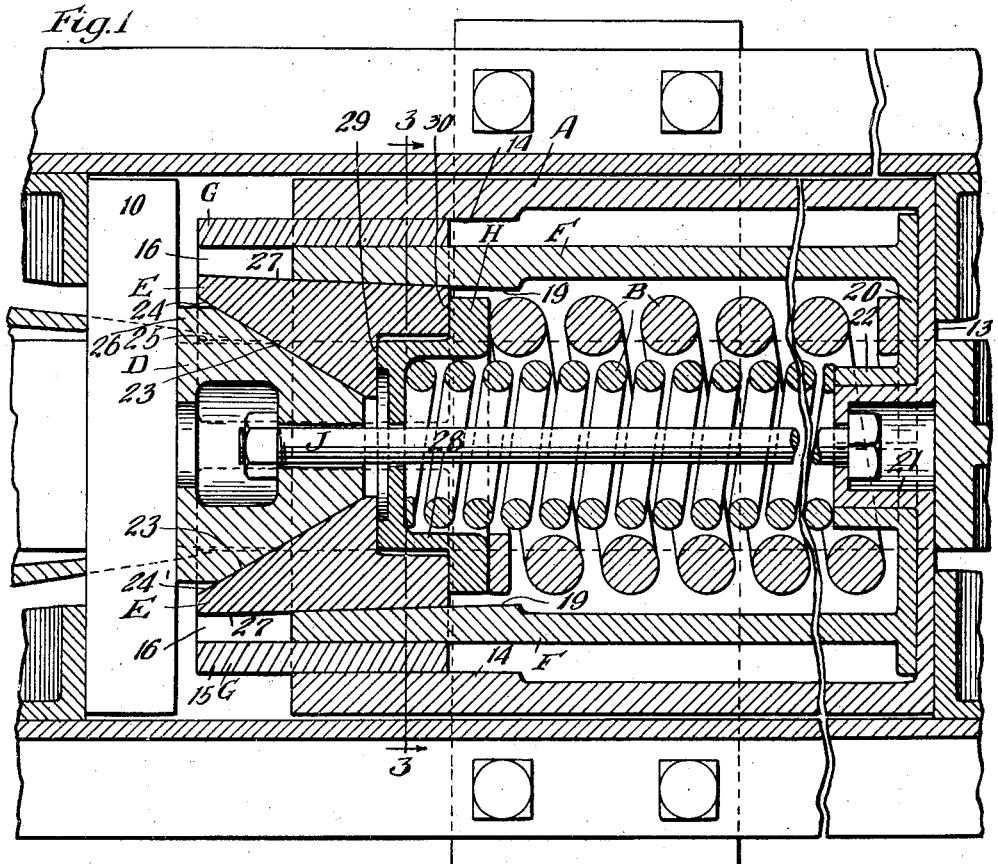
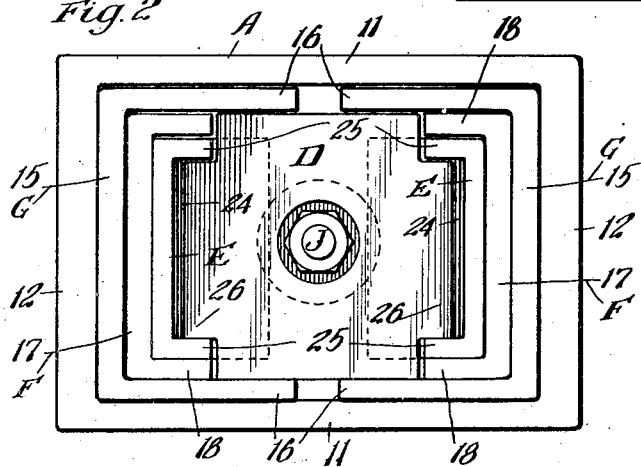
Witnesses
Wm. Geiger
Inventor
John F. O'Connor
By Geo. J. Haight
   His Atty

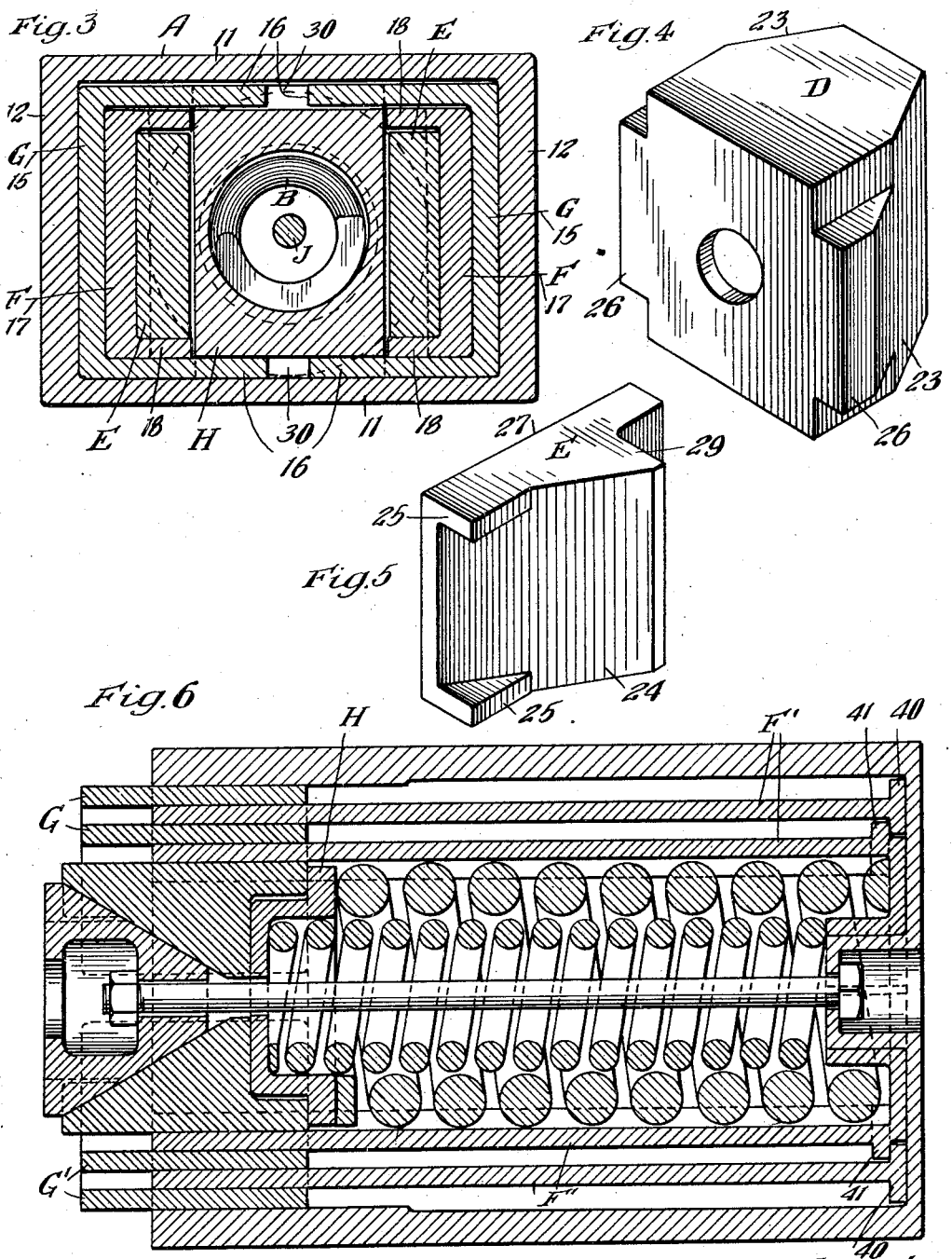

Patented Aug. 23, 1927.

1,640,206

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 27, 1921. Serial No. 525,016.

This invention relates to improvements in friction shock absorbing mechanisms.

One object of the invention is to provide a high capacity shock absorbing mechanism having a large amount of friction wearing areas, the mechanism being especially adapted for use in a railway draft rigging.

Another and more specific object of the invention is to provide a shock absorbing mechanism of the intercalated friction plate type wherein the construction of the shell or container is simplified as compared with previous types where special means have heretofore been required to anchor the stationary friction plates to the shell.

In the drawings forming a part of this specification, Figure 1 is a horizontal, longitudinal, sectional view, parts broken away, of a portion of a railway draft rigging showing my improvements in connection therewith. Figure 2 is an end elevation of the front or outer end of the shock absorbing mechanism proper shown in Figure 1. Figure 3 is a vertical, transverse, sectional view of the shock absorbing mechanism proper corresponding to the section line 3—3 of Figure 1. Figures 4 and 5 are detail perspectives of the wedge and one of the friction shoes, respectively, employed in the construction shown in Figures 1 to 3. And Figure 6 is a view similar to Figure 1 illustrating a somewhat different embodiment of the invention.

Referring first to the construction illustrated in Figures 1 to 5 inclusive, the shock absorbing mechanism proper is shown assembled between the usual draft sills and stop lugs of a car underframe and has associated therewith a front follower 10.

The improved shock absorbing mechanism proper, as shown, comprises, broadly, a container or friction shell spring cage casting A; a spring resistance B; a wedge D; a pair of wedge-friction-shoes E—E; a pair of relatively stationary friction plate elements F—F; a pair of relatively longitudinally movable friction plates G—G; a spring follower H; and a retainer bolt J.

The casting A is of rectangular hollow box-like form having top and bottom parallel walls 11—11, parallel side walls 12—12 and integral rear vertical wall 13, the latter functioning as the rear follower of the mechanism in conjunction with the corresponding stop lugs. The inner faces of the side walls 12 of the casting A near the front or outer end thereof are formed to provide friction surfaces 14—14 extending parallel to the center line of the mechanism. It will be noted at this point that the casting A is of simple construction, easily molded and finished and is free, on the interior thereof, from ribs, shoulders or other special means such as heretofore employed to anchor a series of stationary friction plates.

The two movable friction plates G are of like construction and each comprises a main vertically extending web 15 and top and bottom horizontally extending flanges 16—16, thus rendering the plate G of substantially channel cross section, as indicated in Figures 2 and 3. The top and bottom flanges 16 are not employed as friction generating surfaces but both the inner and outer faces of the web 15 are employed as friction surfaces to cooperate with the friction surfaces 14 and the friction surfaces on the stationary friction members F, hereinafter specifically described.

The relatively stationary friction plate members F, two in number, are telescoped within the respective movable friction plates G, as shown in Figures 2 and 3. Each of said stationary friction plates F is also of channel cross section consisting of a main web 17 and top and bottom horizontally extending flanges 18—18. The outer surface of the web 17 which frictionally cooperates with the corresponding movable friction plate G extends preferably parallel to the center line of the mechanism whereas the inner friction surface 19 of each stationary plate F is preferably inclined rearwardly and inwardly toward the center line of the mechanism, as best shown in Figure 1. The outer ends of the stationary plates F lie flush with the outer end of the casting A and said members F are extended to the inner end of the casting A where they are formed with laterally extended flanges 20 which bear upon the rear wall 13 of the casting A. Said flanges 20 are preferably so formed as to fit around the hollow boss 21 in the casting A, as indicated at 22. With the construction described, it will be noted that the stationary plates F bear against the rear wall of the casting A and hence are held against longitudinal movement inwardly of the casting A during a compression stroke, said plates F being readily assembled and disassembled from the casting A, as will be evident.

The wedge D is disposed centrally of the mechanism and is in engagement with the front follower 10. Said wedge D has oppositely disposed wedge faces 23—23 converged inwardly of the container as clearly shown in Figure 1. Said wedge faces 23 cooperate with corresponding wedge faces 24 provided on the inner sides of the two wedge-friction-shoes E. Each of the latter, at the outer end of the wedge face 24, is formed with upper and lower triangular flanges 25—25 which straddle the extended side portions 26—26 of the wedge D. Each wedge-shoe E is provided on the outer side thereof with a friction surface 27 inclined to correspond and cooperate with the adjacent friction surface 19 of a stationary plate F.

The main spring B rests at its inner end against the flanges 20 of the stationary plates F and at its forward end bears upon the spring follower H which has a central cup-shaped section 28 extending forwardly within the friction shoes E and bearing against the transverse shoulders 29 thereof formed at the inner ends of the wedge faces 24. Said follower H is extended upwardly and downwardly at its inner ends as indicated at 30—30 in Figure 3 so as to overlie the inner edges of the top and bottom flanges 16—16 of the movable friction plates G. In this manner, it will be evident that, during release action of the mechanism, the spring follower H will not only force the friction shoes E outwardly but will also move the plates G outwardly to their normal full release position. In this connection, it will be understood that the flanges 16 of the plates G are extended inwardly beyond the flanges 18 of the stationary plates F for the above purpose, as clearly illustrated in Figures 2 and 3.

The retainer bolt J is anchored at its inner end within the hollow boss 21 of the casting A and at its forward end within the wedge D.

During a compression stroke of the mechanism, the wedge D and wedge-shoes E will be forced inwardly, the plates F remaining stationary as above described. In actual practice, the front follower 10 will normally be spaced a slight distance from the outer ends of the movable plates G in order to allow the pressure-transmitting lateral-pressure-creating system to become fully operative before the plates G are actuated. After the front follower 10 picks up the plates G, the latter, shoes E and wedge D move inwardly simultaneously against the action of the shoes E, the shoes however, being advanced at a slightly faster rate than the wedge D on account of the slope of the friction surfaces 19. In release, the spring B expands to restore the parts to their normal position, as above mentioned. In this connection, it will be noted that the plates F are held against outward movement during the release action on account of the pressure from the inner end of the spring B.

In the arrangement shown in Figure 6, the parts are substantially the same as those shown in Figures 1 to 5, except that four relatively stationary friction plates F'—F' and a corresponding additional number of movable friction plates G'—G' are employed to thereby increase the number of friction surfaces on the intercalated stationary and movable friction plates. In the arrangement of Figure 6, the outer stationary plates F', at their inner ends, are provided with T-section flanges as indicated at 40, one branch of which is caught beneath an offset flange 41 on the next inner stationary friction plate F'. The inner set of stationary plates F' are held against outward movement with respect to the container by the main spring, the same as in the case of the construction previously described. The inner friction plates F' will then in turn prevent outward movement of the outer set of friction plates F'. It will also be understood that all of the movable friction plates G' are of channel cross section and their flanges so extended as to be picked up by the spring follower H' during the release action of the mechanism.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a container having interior friction surfaces; of a follower; a plurality of relatively stationary friction plates within the container and having bearing at their inner ends against the inner end of the container to prevent movement of said plates lengthwise of the container in one direction; a plurality of longitudinal relatively movable friction plates intercalated with said stationary friction plates, said movable plates being mounted for movement relative to said follower; pressure-transmitting and lateral-pressure-creating means cooperable with said intercalated plates; and a spring resistance within the container.

2. In a friction shock absorbing mechanism, the combination with a container having interior friction surfaces; of a plurality of relatively stationary friction plates within the container and having bearing at their inner ends against the inner end of the container to prevent movement of said plates lengthwise of the container in one direction;

a plurality of longitudinal relatively movable friction plates intercalated with said stationary friction plates; pressure-transmitting and lateral-pressure-creating means cooperable with said intercalated plates; and a spring resistance within the container, said spring resistance bearing on the inner ends of said stationary friction plates.

3. In a friction shock absorbing mechanism, the combination with a container having interior longitudinally extending friction surfaces and an integral inner end wall; of a plurality of relatively stationary friction plates within said container and extending from the outer to the inner end thereof and bearing loosely on said inner end wall of the container; a plurality of relatively movable friction plates cooperable with the friction surfaces of the container and said stationary plates; centrally disposed pressure-transmitting and lateral-pressure-creating means cooperable with said friction plates; and a spring resistance within the container and between said stationary friction plates.

4. In a friction shock absorbing mechanism, the combination with a container having interior longitudinally extending friction surfaces and an integral inner end wall; of a plurality of relatively stationary friction plates within said container and extending from the outer to the inner end thereof and bearing loosely on said inner end wall of the container; a plurality of relatively movable friction plates cooperable with the friction surfaces of the container and said stationary plates; centrally disposed pressure-transmitting and lateral-pressure-creating means cooperable with said friction plates; and a spring resistance within the container and between said stationary friction plates, the stationary friction plates adjacent the spring having lateral flanges at their inner ends providing a bearing for the inner end of the spring.

5. In a friction shock absorbing mechanism, the combination with a hollow rectangular container having an integral inner end wall; of a pair of channel cross section movable friction plates cooperable with the interior surfaces of said container; a pair of relatively stationary friction plates within said movable friction plates and also of channel cross section; a spring resistance; pressure-transmitting wedging means located centrally between and cooperable with said movable and stationary friction plates; and a spring follower interposed between said means and the adjacent end of the spring, said spring follower having portions thereof engageable with the inner ends of the flanges of said channel-shaped movable friction plates.

6. In a friction shock absorbing mechanism, the combination with a container having interior friction surfaces; of a spring resistance; a plurality of relatively stationary friction plates having bearing at their inner ends against the inner end of the container and detachably held within said container by said spring resistance; a plurality of longitudinal relatively movable friction plates intercalated with said stationary friction plates; pressure-transmitting and lateral-pressure-creating means cooperable with said intercalated plates.

In witness that I claim the foregoing I have hereunto subscribed my name this 12th day of December, 1921.

JOHN F. O'CONNOR.